United States Patent
Schiattarella et al.

(10) Patent No.: US 11,841,985 B2
(45) Date of Patent: Dec. 12, 2023

(54) METHOD AND SYSTEM FOR IMPLEMENTING SECURITY OPERATIONS IN AN INPUT/OUTPUT DEVICE

(71) Applicant: Pensando Systems Inc., Milpitas, CA (US)

(72) Inventors: Enrico Schiattarella, Los Altos, CA (US); David Antony Clear, San Jose, CA (US); Vipin Jain, San Jose, CA (US)

(73) Assignee: Pensando Systems Inc., Milpitas, CA (US)

( * ) Notice: Subject to any disclaimer, the term of this patent is extended or adjusted under 35 U.S.C. 154(b) by 485 days.

(21) Appl. No.: 17/011,884

(22) Filed: Sep. 3, 2020

(65) Prior Publication Data

US 2022/0067221 A1  Mar. 3, 2022

(51) Int. Cl.
*G06F 21/85* (2013.01)
*G06F 21/60* (2013.01)
*H04L 9/08* (2006.01)
*G06F 1/00* (2006.01)
*H04L 9/32* (2006.01)
*H04L 9/40* (2022.01)
*G06F 21/31* (2013.01)
(Continued)

(52) U.S. Cl.
CPC .......... *G06F 21/85* (2013.01); *G06F 9/45533* (2013.01); *G06F 13/4221* (2013.01); *G06F 21/31* (2013.01); *G06F 21/602* (2013.01); *H04L 9/088* (2013.01); *H04L 9/0897* (2013.01); *H04L 9/3278* (2013.01); *H04L 63/20* (2013.01); *G06F 2213/0026* (2013.01)

(58) Field of Classification Search
CPC .. G06F 21/85; G06F 9/45533; G06F 13/4221; G06F 21/31; G06F 21/602; H04L 9/088; H04L 9/0897

USPC .......................................................... 713/189
See application file for complete search history.

(56) References Cited

U.S. PATENT DOCUMENTS 10,693,638 B1 *  6/2020  Cignetti ................ G06F 21/602
11,363,021 B1 *  6/2022  Grubin ...................... H04L 9/08
11,516,186 B1 * 11/2022  Ambaliya ............... G06F 21/72
(Continued)

OTHER PUBLICATIONS

Thales, "nShield General Purpose Hardware Security Modules", http://go.thalesesecurity.com/rs/480-LWA-970/ images/ThalesEsecurity_Shield_HSM_Family_br.pdf, retrieved Sep. 2, 2020, 12 pages.

*Primary Examiner* — Dereena T Cattungal
(74) *Attorney, Agent, or Firm* — LOZA & LOZA, LLP

(57) ABSTRACT

Methods and systems for implementing security operations in an input/output (I/O) device are disclosed. In an embodiment, an I/O (Input/Output) device involves an I/O port, a host bus configured to be connected to a host, a data processing pipeline within the I/O device coupled to the I/O port and to the host bus to process and forward data between the I/O port and the host bus, and a hardware security module (HSM) within the I/O device coupled to the host bus and to the data processing pipeline, the HSM comprising a crypto engine configured to encrypt and decrypt data of the data processing pipeline, and a secure key storage coupled to the crypto engine containing encryption keys for use in encrypting and decrypting packets, wherein the secure key storage contains keys that are encrypted by the HSM and that are accessible through the HSM.

23 Claims, 7 Drawing Sheets

(51) Int. Cl.
*G06F 13/42* (2006.01)
*G06F 9/455* (2018.01)

(56) References Cited

U.S. PATENT DOCUMENTS

| | | | |
|---|---|---|---|
| 2012/0281839 A1* | 11/2012 | Arnold | H04L 9/0897 380/277 |
| 2016/0149877 A1* | 5/2016 | Kancharla | G06F 9/45558 713/171 |
| 2017/0317832 A1* | 11/2017 | Surdu | H04L 9/3234 |
| 2018/0082076 A1* | 3/2018 | Murray | H04L 63/10 |
| 2019/0190892 A1* | 6/2019 | Menachem | G06F 21/602 |
| 2020/0097682 A1* | 3/2020 | Couillard | G06F 21/72 |
| 2021/0144141 A1* | 5/2021 | Lee | H04W 12/043 |

* cited by examiner

METHOD AND SYSTEM FOR IMPLEMENTING SECURITY OPERATIONS IN AN INPUT/OUTPUT DEVICE

BACKGROUND

Demand for high-quality computer network security tends to increase together with demand for higher data rates in communications. High speed Ethernet adapters provide high data rates for network communications, but may be slowed by high quality security measures. In some cases, a host processor performs the cryptographic operations, while in other cases, a network adapter includes an integrated high-performance cryptography engine. As attackers continue to succeed in infiltrating cloud services and smart systems, the demand for encryption and other security measures increases.

SUMMARY

Methods and systems for implementing security operations in an input/output (I/O) device are disclosed. In an embodiment, an I/O (Input/Output) device involves an I/O port, a host bus configured to be connected to a host, a data processing pipeline within the I/O device coupled to the I/O port and to the host bus to process and forward data between the I/O port and the host bus, and a hardware security module (HSM) within the I/O device coupled to the host bus and to the data processing pipeline, the HSM comprising a crypto engine configured to encrypt and decrypt data of the data processing pipeline, and a secure key storage coupled to the crypto engine containing encryption keys for use in encrypting and decrypting packets, wherein the secure key storage contains keys that are encrypted by the HSM and that are accessible through the HSM.

In an embodiment, for at least some of the data, the HSM crypto engine operates independent of the host using a cryptographic context (crypto-context) that is determined independent of the host. In an embodiment, the HSM further comprises a key usage interface, wherein the crypto-context is determined by a policy manager, and wherein the policy manager is external to the host and the I/O device.

In an embodiment, the HSM further involves a key usage interface coupled to the data processing pipeline, wherein the key usage interface is accessed by key users of the host through the host bus to encrypt and decrypt data in the data processing pipeline and wherein the key usage interface authenticates and identifies the key users based on functions of the host bus that are invoked by the key users to access the data processing pipeline.

In an embodiment, the key users are virtual machines, the functions are virtual functions of the host bus and the virtual machines are authenticated based on presence on the host bus and identified based on virtual functions invoked by the respective virtual machine.

In an embodiment, the HSM includes a plurality of virtual HSMs and wherein the virtual machine is authenticated to one of the virtual HSMs.

In an embodiment, the data processing pipeline parses data to determine header source and destination data and wherein the key usage interface receives the header source and destination data to determine a cryptographic context for the respective packets.

In an embodiment, the HSM uses the cryptographic context of a respective packet to determine keys to use to encrypt and decrypt the respective packet.

In an embodiment, the HSM further involves a protected memory partition of a memory, the HSM writes the encryption keys into the protected memory partition and the crypto engine reads keys from the protected memory partition to use to encrypt and decrypt the packets.

In an embodiment, the secure key storage is persistent and the HSM further involves a trust module, the trust module having a processor and a trust key, and the trust module is configured to read the keys from the secure key storage, decrypt the keys using the trust key and write the decrypted keys into the protected memory partition and to read the keys from the protected memory partition, to encrypt the keys using the trust key and write the keys into the secure key storage.

In an embodiment, wherein the trust key is a physical hardware key.

In an embodiment, the physical hardware key is a physically unclonable function tied to physical properties of a silicon die on which the HSM is formed.

In an embodiment, the HSM further involves a key management interface coupled to the host bus and to the secure key storage to conditionally allow key management of the keys of the secure key storage by a connected host through the host bus.

In an embodiment, the key management interface authenticates the connected host based on presence on the host bus as a virtual machine and based on a virtual function invoked by the virtual machine and exposes a set of keys to the host in response to the authentication.

In an embodiment, an external port is separated from the data processing pipeline and the HSM involves a key management interface coupled to the external port for communication with an external policy manager.

In an embodiment, the external port is coupled to the HSM through a processor within the I/O device and the processor has a secure execution context used in communication with the external policy manager and the key management interface.

In an embodiment, the secure execution context is a secure monitor mode of an ARM processor.

In an embodiment, the key management interface authenticates the external policy manager using credentials and the key management interface exposes a set of keys to the external policy manager in response to the authentication.

In an embodiment, the device has a form factor of a network interface card for a PCIe slot of a server.

In an embodiment, a method involves processing data in a data processing pipeline coupled between an I/O port and a host bus within an I/O device, receiving data from the data processing pipeline at a hardware security module (HSM) coupled to the data processing pipeline and within the I/O device, processing and forwarding data in the data processing pipeline between the I/O port and the host bus, encrypting and decrypting the received data by a crypto engine within the HSM using locally stored keys that are decrypted and copied from a secure key storage of the HSM, wherein the secure key storage contains keys that are encrypted by the HSM and that are accessible through the HSM.

In an embodiment, the HSM determines a cryptographic context for the respective received data based on the respective PCIe endpoint of the respective packets.

In an embodiment, encrypting and decrypting the received data involves selecting keys for use in encrypting and decrypting that are identified by the respective cryptographic context.

In an embodiment, the method involves reading the encrypted keys from the secure key storage, decrypting the keys by the crypto engine, and writing the decrypted keys into a protected memory partition of a memory, wherein encrypting and decrypting the received data comprises encrypting and decrypting the keys using keys in the protected memory partition.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
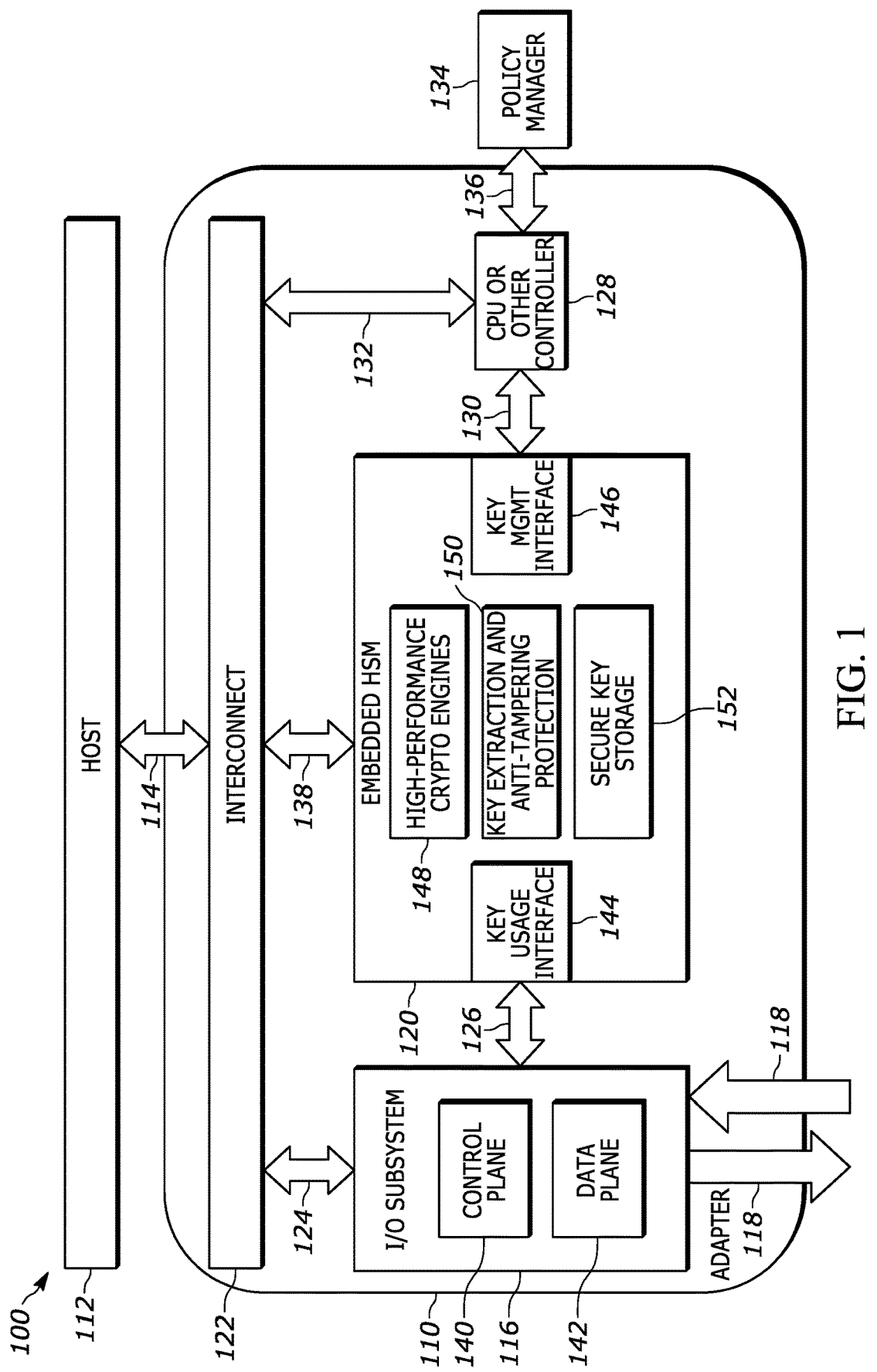
FIG. 1 depicts a block diagram of a computer system with a network interface card that has an embedded HSM in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

The described I/O (Input/Output) device runs critical infrastructure security functions in an independent, isolated environment on the device. As a network adapter, the device runs these operations apart from the server that hosts the adapter. This isolation provides a significant boost to data security. Each agent of the network adapter may be provided with a unique access port to the security services needed by that agent. In some embodiments, physical access to a unique port or pathway is used as authentication of the agent seeking access. This allows crypto operations to be performed with less latency and more agents can be supported in less time. The independent, isolated environment also enhances security by avoiding a need for certificates and credentials that might otherwise be vulnerable to interception and unauthorized use. Many agents have a large attack surface in the form of a hypervisor, operating system, applications, a web front-end, and user-errors. In some embodiments, there are agents that do not use keys for some authentication and identification. Without keys to expose, the attack vectors are reduced.

A common security solution is a separate isolated hardware security module (HSM). HSMs are available in a variety of form factors and with a variety of different interfaces. They are usually designed to keep all encryption keys secure from unauthorized network and physical access. Crypto-users are allowed use of the keys within the HSM but are not allowed to extract or modify the keys. Crypto-officers are allowed to manage the keys, by e.g., generating, deleting, importing, and backing up the keys, but only after passing higher levels of authentication and identification. As a separate standalone device, the HSM is accessed by many agents through a single port or set of ports. In order to eliminate the vulnerability from this common access point, the HSM has strict requirements for authentication and identification and is protected against physical tampering.

The HSM may use logical partitions to expose different virtual HSMs to different crypto-officers and crypto-users. Upon authenticating to the HSM, each crypto-officer and each crypto-user will have access to one or only a few logical partitions. Different authentications may be required to access different logical partitions. The separation between different logical partitions prevents one crypto-officer or crypto-user from accessing the keys of another. In some examples, one or a few crypto-officers manage the keys of a logical partition that serves multiple crypto-users within a particular tenant, organization, cluster, team, etc. Logical partitions may be used as an administrative grouping of keys under a particular tenant, organization, cluster, team, etc. with access rights available to administrators and users within that grouping.

As described herein, aspects of both an HSM and high performance crypto-accelerators are combined and integrated into an I/O device. The physical location and the dedicated access routes enable high performance, low-latency crypto operations. The hardware may also be configured so that crypto-officers have a separate interface, even a separate physical interface from crypto-users. Each agent may be physically connected to the resources that it is allowed to use. The integrated HSM may be configured with secure encrypted key storage using an unextractable root of trust. The high-speed crypto engines or high-speed crypto accelerators may be used to ensure high data rates but with fast access to protected memory regions that hold the encryption keys and other aspects of the cryptographic context.

As a PCIe (Peripheral Component Interconnect express) adapter card, the I/O device offers a transparent binding of a crypto-context for network traffic that is given by the PCIe endpoint. The binding is transparent to the host and implicit in the PCIe endpoint. This may be provided for storage traffic and/or for network traffic. Host resources do not need to be consumed with the cryptographic operations but only with determining source, endpoints, and data. In some instances, such as with legacy software, the host resources may not even be aware that encryption is being used at the I/O device.

FIG. 1 is a block diagram of a server or other computer system 100 with a network interface card (NIC) 110 that has an integrated HSM 120 that includes high performance crypto engines 148. The Network Interface Card (NIC) 110 is in the form of an adapter card with a Peripheral Component Interconnect Express (PCIe) interface 114 to a host computer or host 112, also referred to as a host bus. The adapter card is configured to be installed into a PCIe slot of the host. The present embodiments are described in the context of a standard PCIe slot adapter card which provides up to 32 lanes of high-speed data traffic with the host. However, PCIe provides other form factors and bus variations that may be used such as mini PCIe, PEM, mSATA (mini Serial Advanced Technology Attachment), M.2, and oculink to suit different host configurations. Still other form factors and interfaces other than PCIe may be used to suit different types of hosts. Typically, the host is a server computer running multiple VM (Virtual Machine) instances, however other processing and data communications configurations may be used including NAS (Network Attached Storage) serving data blocks through an attached network interface.

As the network interface, the NIC 110 includes an I/O subsystem 116, for example an Ethernet subsystem, with I/O ports 118 to connect the I/O subsystem to external networks. The ports are in the form of multiple Ethernet ports for data transmission at high data rates to other I/O devices, such as NICs coupled to other servers and to wide area networks coupled to client or other server systems. However, other data communication protocols may be supported and the data may be communicated in a different format including blocks, applications, containers, or workloads. The I/O subsystem includes a control plane 140 to control operations performed on the I/O subsystem and a data plane 142 to perform those operations. The operations may include physical layer (PHY) operations, parsing and deparsing packets, and performing a variety of match action operations on data packets. The operations may also include cryptographic operations with the aid of the HSM 120.

While the description is provided primarily in the context of Ethernet packets and other data packets, the techniques, structures, and principles herein may be applied to other data forms such as blocks, applications, carriers, or workload. These principles may also be applied to other data interfaces such as NVMe (Non-Volatile Memory Express), SATA (Serial Advanced Technology Attachment), SAS (Serial Advanced Small Computer System Interface), for storage or a combination of different interfaces and data forms.

The HSM 120 is embedded within the NIC and faces the I/O subsystem with a key usage interface 144. Upon receiving and parsing a packet, or other data, the I/O subsystem is able to determine identifying information such as header source and destination data, e.g. as a 5-tuple, for the packet and access the key usage interface 144 through a suitable key usage interconnect 126. A TCP/IP (Transmission Control Protocol/Internet Protocol) 5-tuple includes the source IP address and port number, the destination IP address and port number, and the protocol in use. The HSM 120 receives the packet and the identifying data and determines a cryptographic context including key and session information. The crypto-context provides the encryption information associated with the encryption operations to be performed with the packet.

The HSM then performs the appropriate decryption in the high-performance crypto engines 148. Alternatively, the key may be made available to an external crypto engine on the NIC with appropriate protections. The HSM 120 has access to a secure key storage 152 through a key extraction and anti-tampering mechanism 150 that allows the HSM to extract the keys, decrypt the keys, and write the keys to a protected memory partition for use by the high-performance crypto engines. The secure key storage 152 may be in the HSM or another location. The secure key storage may be made persistent, anti-tampering, and insulated from power failures.

The HSM may also perform any other cryptography operations using the high-performance crypto engines. In addition to encryption and decryption, the crypto engines may, for example, sign and verify data, generate random numbers, and/or generate new keys. These additional operations may be used for TLS (Transport Layer Security) session establishment, IPSEC (Internet Protocol Security), VPN (Virtual Private Network) tunnel termination, and other functions. In some embodiments, the HSM is embedded with anti-tampering features, such as sensors (not shown) to detect tampering attempts. The HSM may respond to tampering by zeroizing the stored keys or destroying the keys and other components of the HSM.

The decrypted packet returns to the I/O subsystem 116 from the HSM 120 for any further actions. The I/O subsystem may then pass the packet through an interconnect interface 124 to a coherent interconnect 122 to be transmitted to the host 112.

The I/O subsystem 116 also receives keys from the host 112 through the PCIe interface 114 and the coherent interconnect 122 for transmission to external devices through the I/O subsystem 116. The packets from the host may be parsed at the data plane 142 to determine e.g., a 5-tuple or other identifying information and then encrypted by the HSM 120 through the key usage interface. After any other suitable actions are performed, the packet is sent through the I/O ports 118 to the intended remote recipient. In both receiving and transmitting, the key usage interface 144 provides access to the high-performance crypto engines 148 to the I/O subsystem 116 without exposing the keys to the I/O subsystem. The I/O subsystem is able to determine the header information such as the 5-tuple, but not the crypto-context and does not have access to any of the crypto keys for that context and is not equipped to perform any of the crypto operations. As a result, it is not possible for an outside actor to access the keys through the I/O subsystem. Similarly, the host 112 is not involved in any crypto operations within the HSM. Packets to and from the host 112 are processed at the I/O subsystem 116 and all crypto operations are performed through the same key usage interface 144, which prevents any outside actor from accessing the keys by accessing the host 112.

While the HSM operations are performed independently of the I/O subsystem and host, neither the HSM nor the NIC prevent additional security operations by the host or other agents in the network. In some operational modes, the host adds a second layer of encryption performed within the host in a separate crypto-context with external agents. In other operational modes, the HSM operations may be disabled and the host's crypto-context is the only operational crypto-context for particular sessions.

Crypto-context and cryptographic context are used herein to refer to the information that is used to determine how to encrypt or decrypt particular data, such as a packet, block, application, carrier, or workload. As used herein, the context is specific to a particular session between a sender and receiver and may include the encryption or decryption key, the key parameters, and the session state information. The crypto-context provides an operational grouping of keys associated with the operations performed on the particular data. In some embodiments, there is a different context for different transmission directions, i.e., one context for sending and a second context for receiving.

In the embodiment of FIG. 1, key management is performed apart from the I/O subsystem 116 by an external component such as a policy manager 134. In some embodiments, a management plane of the platform comprises a PSM (Policy and Services Manager) and agents running on the NIC 110. The PSM in turn consists of multiple services running on controller nodes. Communications between these components may be encrypted and authenticated using mutual TLS (Transport Layer Security) or another suitable encryption scheme. The client and the server authenticate each other using certificates issued by a CA (Certificate Authority) embedded in the PSM. Each PSM CA instance may have a unique signing key, so that the certificates generated by the PSM are only valid within the boundaries of a specific PSM installation. A variety of other security schemes may be used to secure communications between a policy manager and the NIC.

The policy manager 134 in this example, has a separate management port 136 for access to the NIC 110. Communications with the policy manager may not require high speed communications and do not directly affect data rates on the I/O subsystem. Accordingly, the port may be a high-speed Ethernet port, a much slower Ethernet port, such as 100 MBPS, or another port type such as I2C (Inter-Component Interconnect), UART (Universal Asynchronous Receiver Transmitter), or another suitable interface. In this embodiment, the policy manager 134 communicates with a processor 128, such as a central processing unit (CPU) or other controller, through the separate management port 136. The processor authenticates and identifies the policy manager. In some embodiments, the policy manager uses a certificate to establish a TLS session. In some embodiments, the presence of the policy manager on the separate port is used as authentication or as an additional security measure beyond the TLS or other type of secure session.

In some embodiments, the policy manager 134 communicates with the processor 128 using the high-speed Ethernet I/O ports 118 of the I/O subsystem 116. In this case, the policy manager may have more rigid authentication and identification processes to ensure the security of the HSM from bad actors.

The processor 128 is able to receive key management instructions from the policy manager 134 and then access a key management interface 146 of the HSM 120 through a secure processor port 130. The processor then operates as a crypto-officer to the HSM and is able to drive management functions, including generating and deleting key pairs and backing up the keys to a persistent storage, such as non-volatile memory, such as flash. The persistent storage may be within the HSM 120, as shown, or in another location on the adapter card.

The processor 128 may use any of a variety of different architectures and instruction sets to suit different requirements for power and capability. In some embodiments, the processor 128 is an ARM Cortex-compliant processor with a Platform Security Architecture that provides high computing power when needed. However, other processor types may be used. In some embodiments, the processor makes calls to the HSM to perform key management operations while the processor is operating in a secure execution context, such as a secure monitor mode as defined by ARM. In some embodiments, key management on the HSM is limited to calls from the processor 128 operating in a secure execution context through the secure processor port 130 to the key management interface 146. This provides additional security against other agents causing unauthorized operations.

As described, key management may be performed by the policy manager 134 independent of the host 112. Many critical and non-critical infrastructure security functions can be run in an independent, isolated environment apart from the host, including the host's hypervisor and any virtual machines. This isolation provides a significant boost to data center security in part because the described hardware architecture and software implementation enable a sound basis in secure systems. Special security measures may be taken to protect the policy manager and its connection to the HSM against attackers. These special security measures do not rely on any functions or capabilities of the host. In addition, the host may be optimized for reliability, efficiency, and speed independent of these security functions.

At the HSM 120, calls from the processor 128 may be implemented by the HSM through a key extraction and anti-tampering mechanism 150 that has access to the secure key storage 152. The keys used by the high-performance crypto engines 148 may be those that are stored in the secure key storage 152 or they may be copies of the stored keys that are written to and stored in a volatile high bandwidth or high speed memory such as DRAM (Dynamic Random Access Memory) that is accessible only to the high-performance crypto engines and other authorized agents. The HSM is able to generate copies of the stored keys and perform other key management operations on the secure key storage through the key extraction and anti-tampering protection.

The NIC 110 performs additional operations using structures that may typically be associated with a NIC. The I/O subsystem has a interconnect interface 124 to the coherent interconnect 122 that is connected to other components of the NIC including the HSM 120 through an interconnect bus 138 and to the processor 128 through another bus 132. The coherent interconnect 122 enables the components to interact and enables these components to connect through the PCIe interface 114 to the host 112. In some embodiments, the interconnect is a coherent interconnect to shared cache resources (not shown) as defined by ARM. Such an interconnect allows each of the illustrated blocks 116, 120, 128 to access a shared memory without losing coherence. In some embodiments, the interconnect is a PCIe bus with each of the attached components being a PCIe endpoint.

Figure 2:
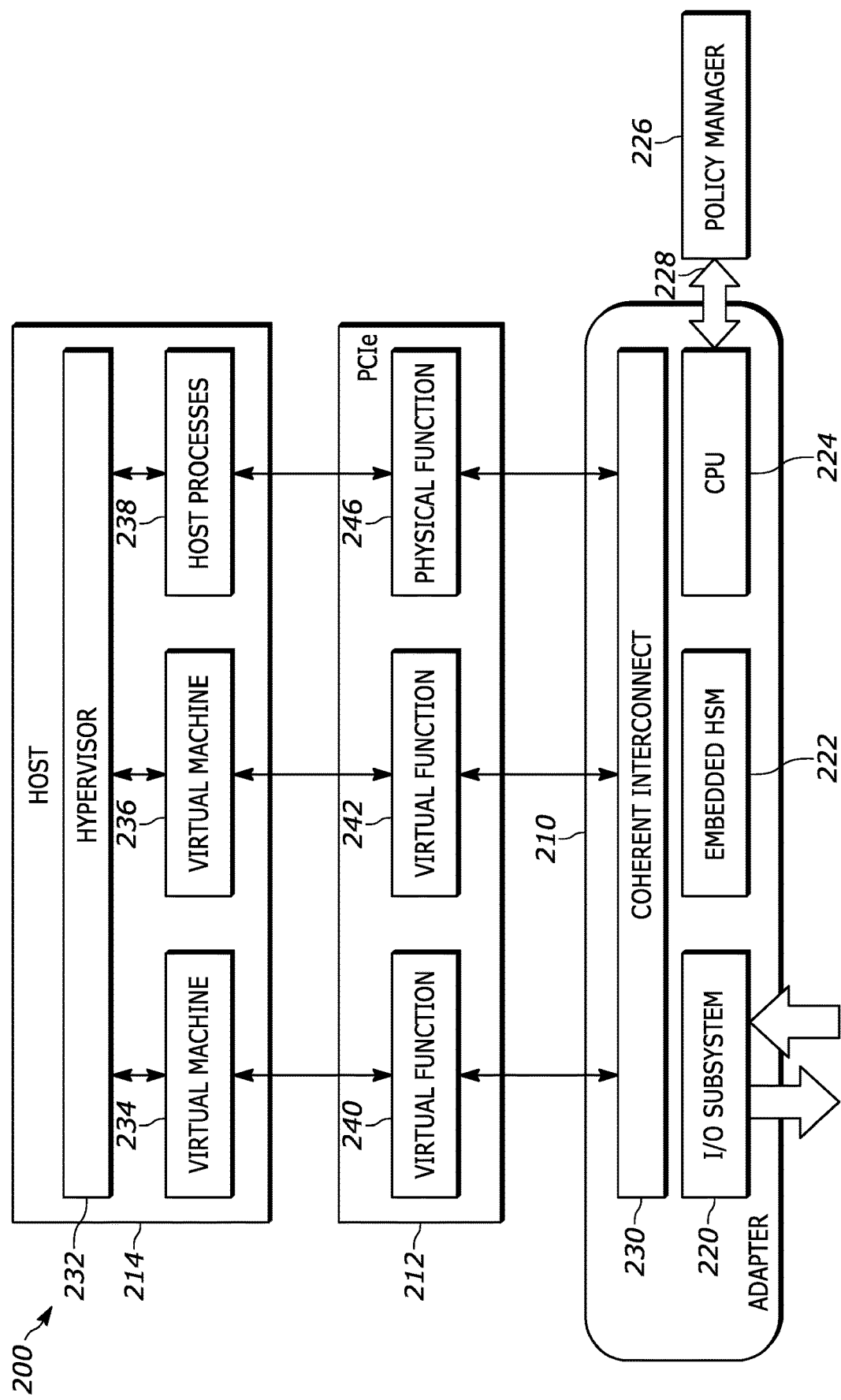
FIG. 2 depicts a block diagram of another computer system with a network interface card that has an embedded HSM in accordance with an embodiment of the invention.

FIG. 2 is a block diagram of an alternative computer system 200 with an I/O device such as an I/O adapter 210 coupled through a host bus 212, such as a PCIe root complex, to a host 214. As described above, the I/O adapter includes an I/O subsystem 220 coupled to an embedded HSM 222 and a processor 224, such as a CPU or other controller, coupled to the HSM 222. The I/O subsystem 220, HSM 222, and processor 224 may be coupled to each other and to other components (not shown) through a coherent interconnect 230. An external policy manager 226 connects to the processor 224 optionally through a separate interface 228.

A hypervisor 232 on the host 214 is coupled to host processes 238 and one or more Virtual Machines (VMs) 234, 236. The host processes may interact with the I/O adapter 210 using Physical Functions (PFs) 246 and the VMs interact using and one or more Virtual Functions (VFs) 240, 242 of the PCIe host bus 212. Using the VFs, the PCIe interface is programmable by the hypervisor and by the VMs for any suitable operating-system-level virtualization (e.g., container and docker system) or machine level virtualization or for a computing system without virtualization features.

The hypervisor 232 generally provides operating system functionality (e.g., process creation and control, file system process threads, etc.) as well as CPU scheduling and memory management for the host 214. In some cases, the host may include programs that implement a machine emulator and virtualizer. The machine emulator and virtualizer may assist in virtualizing respective computer I/O devices in the VMs 234, 236, such as virtualized hard disks, compact disk drives, and NICs. The provided programmable PCIe root complex interface mechanism allows for native hardware speeds when using device emulators. The root complex allows the host 214 to interface with the I/O adapter 210 with existing device drivers without reconfiguration or modification. In some cases, the VFs and PFs have similar driver interfaces such that such devices can be supported by a single driver for Ethernet communications and storage arrays.

The physical functions (PFs) 246 represent full PCIe devices that may be discovered, managed, and configured as normal PCI devices. Physical functions may be configured and managed by the SR-IOV (Single Root Input/Output Virtualization) functionality specified by the PCI SIG (Special Interest Group) to allow multiple VMs 234, 236 to share a single physical function, such as a host process 238, by assigning virtual functions (VFs) 240, 242 to a PF 246. The I/O adapter 210 exposes one or more PFs to the host 214 or hypervisor 232.

As stated, the SR-IOV specification enables a single root function (for example, a single Ethernet port) to appear to virtual machines as multiple physical devices. In other words, the physical I/O device with SR-IOV capabilities may be configured to appear in the PCIe configuration space as multiple functions. The VFs are made available to the hypervisor for allocations to virtual machines. The VFs are configured with one or more BARs (Base Address Registers) to map NIC resources to the host. A VF may map one or more logical interfaces (LIFs) or ports, which are used in the I/O adapter for forwarding and transaction identification. Within a physical device, all virtual functions may have an identical BAR resource layout, stacked sequentially in host PCIe address space. The I/O adapter PCIe interface logic may be programmed to map control registers and NIC memory regions with programmable access permissions (e.g., read, write, execute) to the VF BARs. Each VF BAR may include a VF Device ID (Identifier) that is unique to the VM and VF combination.

With each VF 240, 242 assigned to only one VM 234, 236 and each VM 234 having physical access to the host bus 212, for example a PCIe root complex, through its respective VFs, the I/O adapter 210 can reliably identify each VM based on the VF that the VM is using and the VM's presence on the root complex. The HSM 222 can use this authentication and identification to determine the crypto-context for any session that a VM has established with an external node on the Ethernet network. The VF combined with the PCIe endpoint for any session may also or alternatively be used to determine the crypto-context. In other words, the HSM may expose a different set of keys based on the identity of a virtual machine, as authenticated based on its presence on the host bus and determined based on virtual functions invoked by the respective virtual machine. The key management interface (see e.g., element 146 of FIG. 1) of the HSM is able to authenticate the connected host based on the host's presence on the host bus as a VM and based on a VF invoked by the virtual machine. The HSM then exposes a set of keys to the host in response to the authentication. A different set of keys may be exposed for each different VF.

The key usage interface identifies the VM and exposes a different set of keys for each VM. In other words, for much of the data traffic, different VMs are able to use different set of keys using the key usage interface. However, in some implementations, the different VMs are not able to manage the same keys through the key management interface. In some implementation, a special VM may be generated that has special privileges to manage the keys using the key management interface.

When the cryptography user is the packet processing pipeline, that is the I/O subsystem 220, then the pipeline uses PFs 246 or VFs 240, 242 to identify the data source and to determine an appropriate crypto-context for the respective packet. In some cases, the keys are provided by the host 214 through the respective PF 246 or VF 240, 242. In some cases, the keys are generated by the HSM 222 inside the HSM 222 in response to a host 214 request. In some cases, the keys are pushed from the external policy manager 226. In some cases, the keys are generated inside the HSM 222 in response to a request from the external policy manager 226. This allows keys to be provided and used independent of the host so that, in some cases the host may be unaware that data is being encrypted and decrypted on its behalf.

The low-level crypto functions, such as encrypt, decrypt, sign, and verify may be made directly available to crypto-user software running on the host 214. In the above examples, clients are identified based on PCIe attributes. In some examples, this may be done using a standard PKCS #11 (Public Key Cryptography Standards #11) token interface. In such an example, a software library running on the host 214 may implement this or another standard interface. In some embodiments, network interfaces of an I/O subsystem 220 may be used to allow remote, out-of-band key management.

Logical partitions may be applied to separate functions available to one crypto-user that is establishing a crypto-context from the functions available to another crypto-user, such as access to particular keys, as described above. Logical partitions may also be applied to separate functions of one crypto-officer, such as a host function or the external policy manager 226 from the functions available to another crypto-officer. In this way logical partitions provide a means to expose multiple virtual HSMs to crypto-users and crypto-officers using a single physical device. Each logical partition may be a unique and independent combination of key usage and key management contexts. When the crypto-officer is running on the host 214, an authentication can be determined by PCIe attributes such as a PF 246 or VF 240, 242. The authentication provides access to one or more particular logical partitions. Otherwise explicit credentials may be used to verify the crypto-officer function of a host and allow access to the managed keys through the logical partition.

When the crypto-officer is managing remotely, then PF or VF credentials are not available and access through the partition may be determined based on explicit credentials supplied by the crypto-officer. In such an example, the HSM exposes a different set of keys based on the identity of the policy manager, as authenticated using credentials like TLS certificates, username and passwords, etc. Other sets of keys may be blocked as outside the accessed logical partition. The key management interface authenticates the external policy manager using credentials and then the key management interface exposes a set of keys to the external policy manager in response to the authentication.

Figure 3:
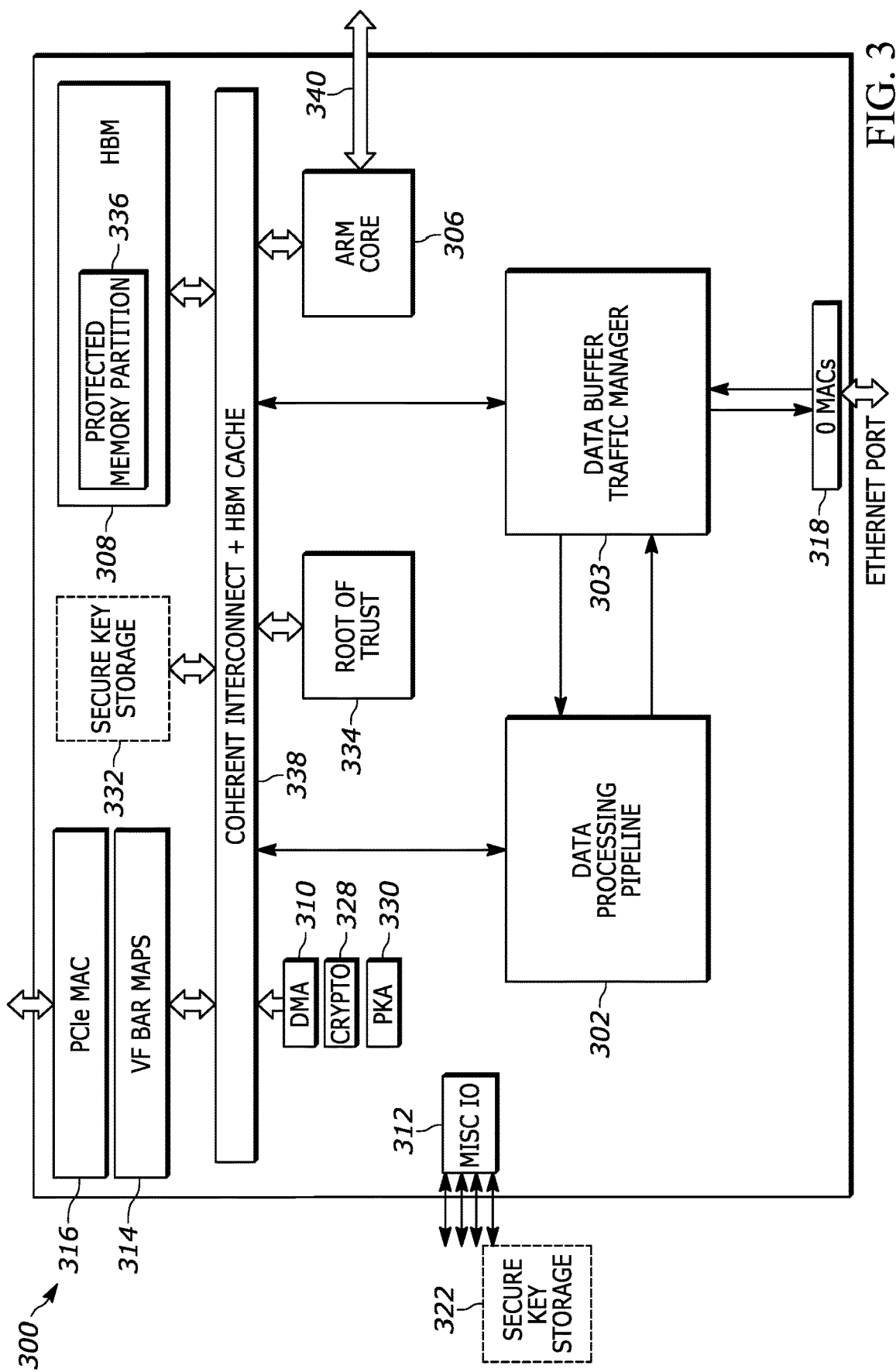
FIG. 3 depicts a block diagram of an example integrated circuit chip suitable for use with the network interface card of FIG. 1 or 2 in accordance with an embodiment of the invention.

FIG. 3 is a block diagram of an example integrated circuit chip in the form of a system on a chip (SOC) suitable for use with a NIC as described above containing an I/O subsystem, an embedded HSM, a processor, and a PCIe bridge as described above. The system 300 serves as an example of implementing the P4 programming language for packet forwarding and various other functions to provide improved network performance. In some embodiments, the system provides improved network capabilities in addition to the security functions described herein.

The system 300 as shown is configured with a data processing pipeline 302, a packet buffer 303, a processor 306, such as an ARM core or other processor, a shared local memory system in the form of a high bandwidth memory HBM 308, flash non-volatile memory, Direct Memory Access (DMA) engines 310, network ports 318 (e.g., Ethernet ports), and miscellaneous I/O ports 312 for operation and debug. The data processing pipeline may include table engines (TE) and match processing units (MPUs). Additional ARM processors or other processors (not shown) of the data processing pipeline may observe and control NIC resources via an address map. The data processing pipeline and/or ARM core may implement a P4 packet processing pipeline although any other suitable packet processing pipelines are possible. While the I/O subsystem may be described with reference to "packet" buffering and processing, the term "packet" is not intended to exclude other data formats such as storage blocks for a storage device. Accordingly, the data processing pipeline is used to represent any data processing pipeline that may be configured to process digital data in any of a variety of different formats.

The system 300 includes a PCIe MAC 316 as a host interface although other interface configurations may be used. The system 300 also includes network interfaces, such as network ports 318, which may use Ethernet or another networking protocol or a combination of protocols. The host interface may be configured to provide communication link(s) with one or more hosts (e.g., host servers) and with client devices. The host interface block may also observe regions of the address space via PCIe BAR maps, such as VF BAR maps 314 to expose NIC functions to a host. In an example, the address map may be initially created according to the principles of ARM memory maps which provide SOC addressing guidelines for a 34-bit memory map.

The PCIe MAC 316 may support a mechanism or a scheme to map resources available at the I/O device to memory-mapped control regions associated with the virtual I/O devices using a pool of configurable PCIe Base Address Registers (BARs) maps coupled with a resource mapping table in the form of VF BAR maps 314 to store mapping information for the virtual I/O devices. The I/O resources provided by the system 300 may be mapped to host addresses. The system includes various other programmable registers. The BARs may include a first memory BAR containing device resources (e.g., device command registers, doorbell registers, interrupt control registers, interrupt status registers, MSI-X interrupt table, MSI-X interrupt pending bit array, etc.) a second BAR containing device doorbells pages, and a third BAR for mapping a controller memory buffer.

In some embodiments, the data processing pipeline 302 includes a P4 programmable pipeline. The P4 domain-specific language for programming the data plane of I/O systems is currently defined in the "$P4_{16}$ Language Specification," version 1.2.0, as published by the P4 Language Consortium on Oct. 23, 2019. P4 programmed DMA interfaces may be presented directly to host virtual functions defined in the VF BAR maps 314 and a processor 306 (e.g. an ARM CPU) of the system 300. Combining the programmable PCIe interface with the P4 pipeline features allows the host virtual switch/NIC to be offloaded from the host to the system 300, such as the illustrated programmable I/O system on a chip, with improved bandwidth and low latency.

The P4 pipeline can be programmed to provide various features, including, but not limited to, routing, bridging, tunneling, forwarding, network ACLs (Access Control List), L4 firewalls, flow-based rate limiting, VLAN (Virtual Local Area Network) tag policies, membership, isolation, multicast and group control, label push/pop operations, L4 load balancing, L4 flow tables for analytics and flow specific processing, DDOS (Distributed Denial of Service) attack detection, mitigation, telemetry data gathering on any packet field or flow state and various others.

In an embodiment, as described above, the HSM is distributed through the system 300 in several hardware blocks. For example, the crypto engines 328 and key usage interface are attached to the coherent interconnect 338 near a block for PKA (Public Key Authentication) 330. This provides fast access for the processors of the data processing pipeline 302. The crypto engines 328 are also coupled to the coherent interconnect 338. A protected memory partition 336 also coupled to the coherent interconnect 338 contains keys for use by the crypto engines. The protected memory partition 336 may be in the HBM or in another location. The crypto engines 328 read keys from the protected memory partition 336 for encrypting and decrypting packets as determined by the cryptographic context of the respective packet. The processor 306 establishes the secure memory regions by properly configuring the coherent interconnect 338 during system boot. In some embodiments, the processor 306 runs the configuration code at the highest level of privilege and the earliest time in the boot process. A Root of Trust (RoT) 334 may play a role in authenticating the basic boot sequence.

A secure key storage 332 is also attached to the coherent interconnect 338 in the form of persistent nonvolatile memory, such as flash memory. In some embodiments, a secure key storage 322 is located off the system 300, such as off a SoC or card, and accessible through a miscellaneous I/O port 312 or another suitable secure port. One or both of the secure key storage 332, 322 may be used. The key extraction and anti-tampering protection are located in a Root of Trust 334 that is also accessible through the coherent interconnect 338. Finally, the key management interface is implemented in the processor 306. The separate port may be through the miscellaneous I/O port 312 or the network ports 318 with substantial authentication. Alternatively, a separate external port 340 that permits direct access by an external policy manager to the processor 306 may be provided on the system 300. While the separate external port 340 is referred to as a management port herein, the separate port may also be used for other purposes in addition to management.

Figure 4:
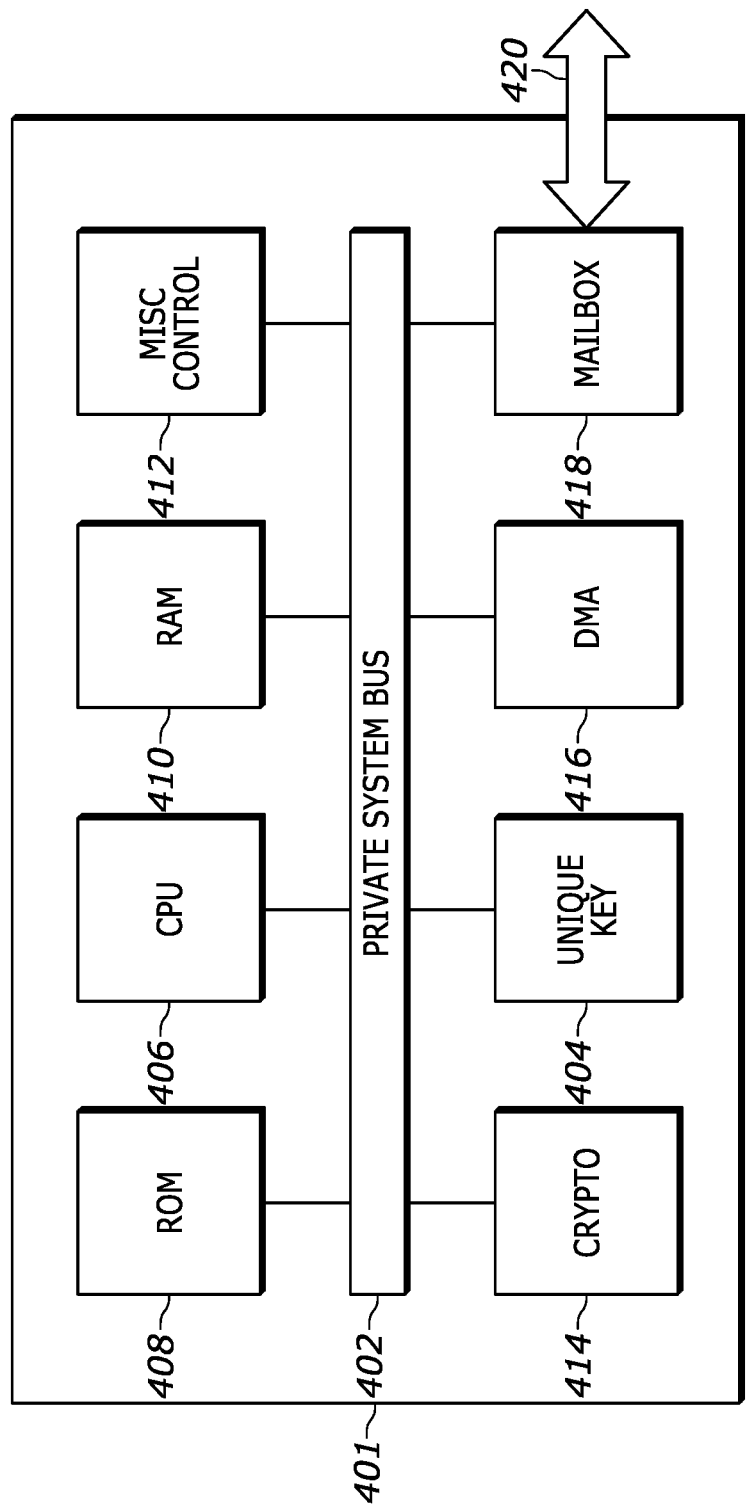
FIG. 4 depicts a block diagram of a root of trust suitable for use with an HSM in accordance with an embodiment of the invention.

An example Root of Trust 334 (also referred to as a trust module) for the system 300 is shown in more detail in FIG. 4, which is a block diagram of components within the Root of Trust (RoT). In some embodiments, the RoT 334 is responsible for the fundamental protection mechanisms in the device. The RoT may be isolated from the rest of the system 300, even with the system on a single chip, by a secure perimeter 401 and has its own CPU 406, ROM 408, RAM 410, and cryptographic engines 414, similar to a Trusted Platform Module (TPM) used in some workstation and server computer systems. The RoT accesses the system's resources outside of its secure perimeter via its own bus mastering DMA (Direct Memory Access) engine 416, and it can receive requests (e.g., to create keys or sign certificates) via a narrow, secure-access interface 420. Other modules can deposit requests and asynchronously pick up responses in a mailbox 418 as they become available.

The RoT has a unique key 404 kept secret within the RoT for use as a seed key for use in other cryptographic functions and to populate the ROM 408. In some embodiments, the unique key 404 is a physical hardware key such as a Physically Unclonable Function (PUF) that holds a unique secret and secure key. This may be from a specialized silicon element of the PUF, tied to physical properties specific to each silicon die on which each RoT is formed, which provides a device-specific seed key. The result is that each chip has a unique PUF seed key that cannot be read outside of the device. Since the PUF is based on physical properties of the silicon die, the PUF cannot be altered or tampered with. This provides inherent anti-tampering protection for the seed key. Other anti-tampering functions may also be provided, such as zeroizing keys or self-destroying in response to sensing a physical intrusion. In some embodiments, the seed key is exclusively used to derive a 256-bit AES (Advanced Encryption Standard) Storage Root Key (SRK) and an ECDSA-P384 Endorsement Key (EK).

The SRK is used to encrypt (wrap) secrets (such as sensitive configuration, symmetric encryption keys, and private asymmetric keys) that can then be written to a persistent secure key storage, such as local non-volatile storage, or exported off of the device for remote storage. When the SRK is configured to not leave the secure perimeter 401 of the RoT, only the original RoT can decrypt and recover the data. The EK is used to build a chain of trust that can attest the authenticity of the NIC adapter or I/O device with embedded HSM. In some embodiments, a certificate, such as a signed X.509 certificate, is installed into the device during manufacturing which authenticates the public part of the EK. In some embodiments, the private part of the EK never leaves the RoT. This is a further anti-tampering measure. The RoT generates a 2nd-level Attestation Key-pair (authenticated via an EK-signed X.509 certificate), and that Attestation Key can be used to sign Nonce challenges. The Nonce challenge, along with the certificate chain rooted at the public Root Certificate, allows an external entity, such as the policy manager 134, for example Policy and Services Manager (PSM), to authenticate the I/O device as genuine.

The RoT 334 may be used to implement and administer secure or trusted and normal application memory spaces. The support may cover hardware DMA engines, DRAM memory (HBM), and even individual memory-mapped hardware registers. Memory regions can be configured as secure, with secure memory regions being accessible only by secure hardware components, such as the ARM software running at a secure level (e.g. EL3, S-EL1), and the protected memory partition 336 that is accessible to the crypto engine 328 of the HSM.

The keys in the secure key storage 332 are encrypted by the RoT 334 and written there in encrypted form by the processor 306 running in a secure execution mode working with the RoT. The secure key storage 332 may be persistent and nonvolatile to further enhance the security. The protected memory partition 336 within the HBM is populated also by the processor 306 running in a secure execution mode where the keys are decrypted by the RoT from the persistent secure key storage and then passed to the ARM processor to write to the secure key storage of the HBM. The ARM processor may be configured to back up each new key to the secure key storage after the RoT generates the new key by encrypting the key at the RoT and writing it to the secure key storage.

Figure 5:
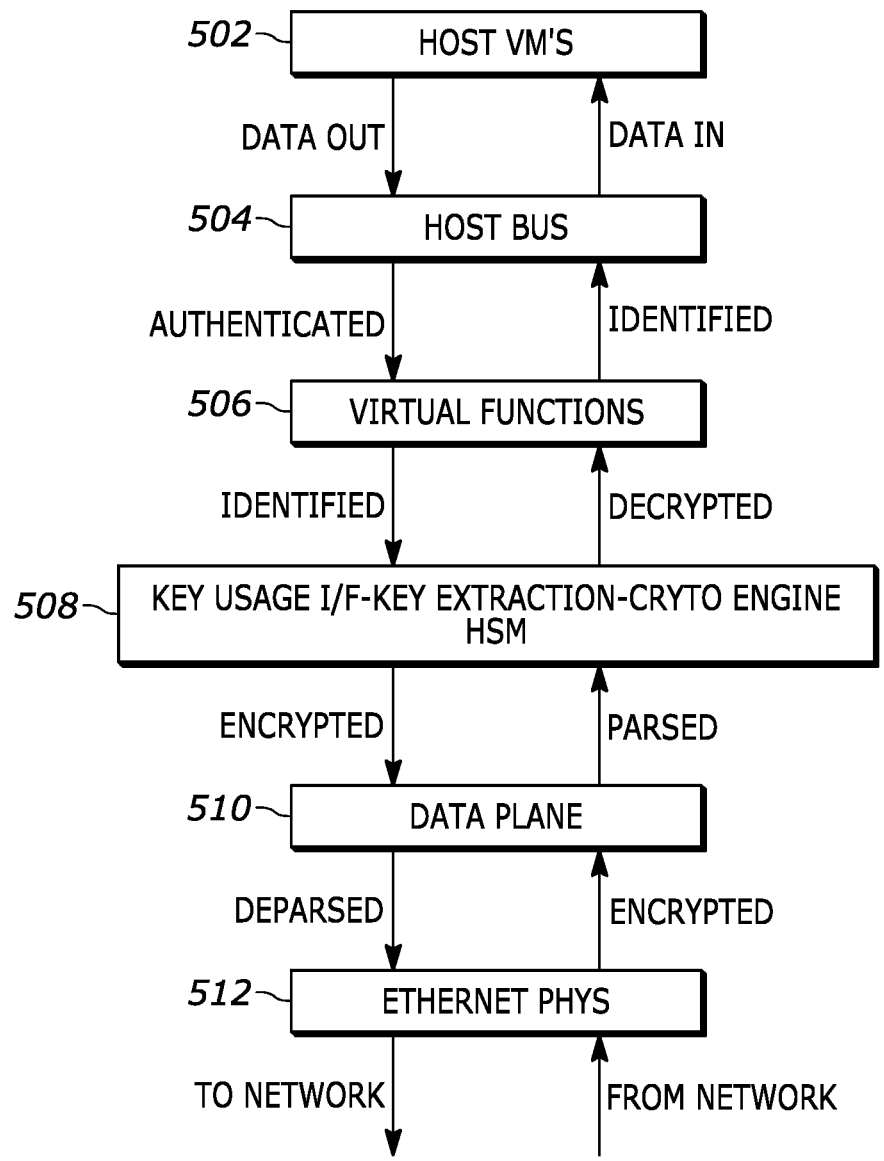
FIG. 5 illustrates key usage as a functional block diagram in accordance with an embodiment of the invention.

FIG. 5 is a functional block diagram of key usage using embodiments as described above. The host VMs 502 generate data in packet form to be written to a PCIe endpoint and transmitted to a network node. The packets have forwarding information, such as a 5-tuple, for transmission and the VM 502 designates a PCIe endpoint, such as an Ethernet data plane 510, and invokes a VF 506 to write the packet. The VM sends the data out through a host bus 504, such as a PCIe bus, to an I/O device such as the NIC described above. The invoked VF 506 of the host bus receives the write request and sends it through the key usage interface of the HSM 508. At the HSM 508, the VM 502 is authenticated based on the VM's presence on the host bus 504 and the VM 502 is identified based on the invoked VF 506, there being typically only one VM 502 for each VF 506. The HSM determines the crypto-context based on the 5-tuple and the VF identification and then encrypts the packet with a proper key for the crypto-context. In some embodiments, the keys are read by the crypto engine from the protected memory partition of the HBM through the coherent interconnect. The HSM forwards the encrypted packet to the Ethernet data plane 510 where the encrypted packet is deparsed and then sent to the Ethernet PHY 512 to be sent across the network.

Packets coming in from the network are received at the Ethernet PHY 512 in encrypted form. The Ethernet data plane 510 parses the packets to determine the significant forwarding information, such as the 5-tuple and any other information. The parsed information is provided to the HSM 508. The HSM determines a cryptographic context using the forwarding information and decrypts the packet using the appropriate key of the crypto-context which is read from the protected memory partition. The decrypted packet then passes through the appropriate VF 506 to be sent through the host bus 504 to the corresponding host VM 502. Thus, the VM is the crypto-user and securely sends and receives packets through the Ethernet PHY without performing any crypto operations or even needing to know about any keys, sessions, or other cryptographic information.

Figure 6:
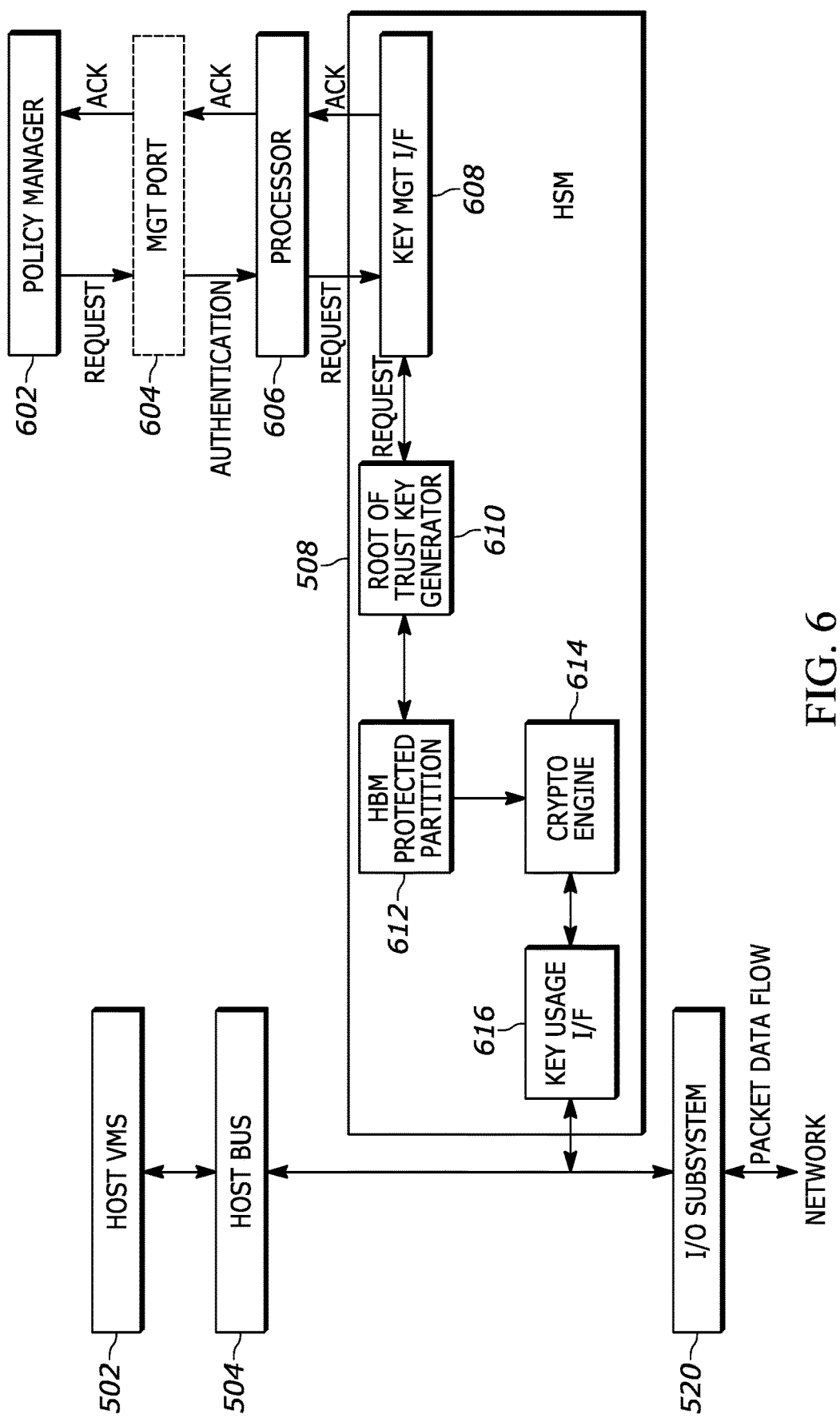
FIG. 6 illustrates key management as a functional block diagram in accordance with an embodiment of the invention.

FIG. 6 is a functional block diagram of an example of key management with respect to an embedded HSM as described above. For context, the host VMs 502 write and read packets through the host bus 504 to the I/O subsystem 520 to accomplish packet data flow to the network. The packets are encrypted and decrypted by a crypto engine 614 of the HSM 508 through a key usage interface 616 using keys in a protected memory partition 612 of an HBM. These packet forwarding and encryption/decryption operations are the same operations described with respect to FIG. 5 and are presented in FIG. 6 to provide context.

In an unrelated process, a policy manager 602 sends requests optionally through a management port 604 to a processor 606 of the I/O device. The request is authenticated by the request's presence on the management port or, if the request is received through the I/O subsystem, then the request is authenticated using keys and certificates. The request is sent by the processor 606 to a key management interface 608 of the HSM to manage the keys of the HSM. The request may be in the form of a call or command In this case, the processor is the crypto-officer and is authenticated based on the processor's direct access to the key management interface 608. Any authentication using keys and certificates has been performed by the processor with the policy manager. If the HSM uses virtualization, then the crypto-officer will have access only to particular ones of the virtual HSMs. The request acts on the protected memory partition 612 which may be within the HBM to delete keys, change associations and policies for particular keys and/or to perform other management operations. If the request is to generate keys, then the crypto-engines 328 are able to quickly generate new keys and use the keys for encrypting and decrypting data that transits through the I/O interface. For some special functions, such as device attestation or other high security functions, a key generator of a root of trust 610 is able to generate the keys and write the keys into the protected memory partition within the HBM. After the key management operations are performed, then an acknowledgment is sent back to the policy manager 602 by the key management interface 608 through the processor 606 and through the management port 604.

Figure 7:
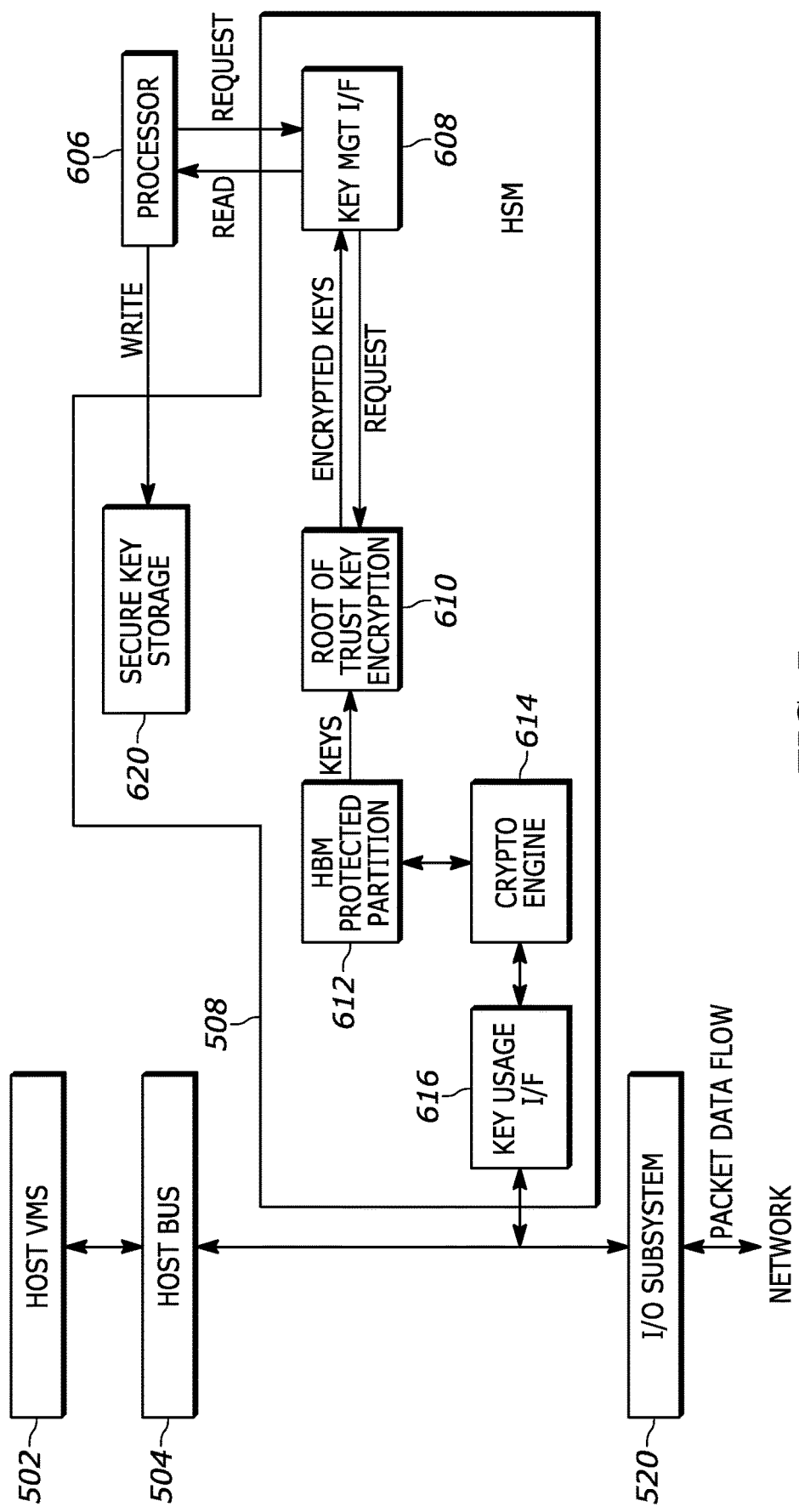
FIG. 7 illustrates key backup as a functional block diagram in accordance with an embodiment of the invention.

FIG. 7 is a functional block diagram of key backup with respect to an embedded HSM as described above. As in FIGS. 5 and 6, host VMs 502 send and receive packets through a network using a host bus 504 and I/O subsystem 520. The HSM 508 encrypts and decrypts packets in a crypto engine 614 using keys in the protected memory partition 45 within the HBM. The HSM 508 may receive keys through the key management interface 608 from an external policy manager (not shown) or from the host through a VM the provides keys to the processor 606 through, e.g. a driver call. In many instances, the keys are generated by the HSM.

In some embodiments, after a key management event or based on a timer the processor 606 may initiate a key backup process. The processor sends a request to the key management interface 608 to back up the keys. In some embodiments, the request is an API (Application Programming Interface) call or a function call. The key management interface requests some or all of the keys that are in the protected memory partition 612 within the HBM. These keys are first encrypted by the root of trust 610, then the encrypted keys are provided through the key management interface 608 to the processor 606 which then writes the keys in encrypted form into a secure key storage 620. The secure key storage is shown as part of the HSM 508 however the secure key storage may be positioned in different physical locations.

When the system boots, or after maintenance, then the keys in the secure key storage are read and passed to the root of trust. The root of trust decrypts the keys and passes the keys to the protected memory partition for use by the crypto engines. In some embodiments, the protected memory partition is protected from access by I/O subsystem and the host, inter alia. The encryption engines and the processor, operating in a protected or secure mode, have access but this access may also be limited to specific operation as described herein.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An integrated circuit device comprising:
   an I/O port;
   a host interface configured to be connected to a host, wherein the host interface comprises a Peripheral Component Interface express (PCIe) interface;
   a data processing pipeline within the integrated circuit device coupled to the I/O port and to the PCIe interface to process and forward data between the I/O port and the PCIe interface; and
   a hardware security module (HSM) within the integrated circuit device coupled to the PCIe interface and to the data processing pipeline, the HSM comprising a crypto engine configured to encrypt and decrypt data of the data processing pipeline, and a secure key storage coupled to the crypto engine and configured to contain encryption keys for use in encrypting and decrypting packets, wherein the secure key storage is configured to contain keys that are encrypted by the HSM and that are accessible through the HSM;
   wherein the HSM further comprises a key usage interface coupled to the data processing pipeline, wherein the key usage interface is configured to be accessed by key users of the host through the PCIe interface to encrypt and decrypt data in the data processing pipeline and wherein the key usage interface is configured to authenticate and identify the key users based on functions of the PCIe interface that are invoked by the key users to access the data processing pipeline; and wherein the key users are virtual machines and wherein the functions are virtual functions of the PCIe interface and wherein the virtual machines are authenticated based on presence on the PCIe interface and identified based on virtual functions invoked by the respective virtual machine.

2. The integrated circuit device of claim 1, wherein, for at least some of the data, the HSM crypto engine operates independent of the host using a crypto-context that is determined independent of the host.

3. The integrated circuit device of claim 2, wherein the crypto-context is determined by a policy manager, and wherein the policy manager is external to the host and the integrated circuit device.

4. The integrated circuit of claim 1, wherein the HSM includes a plurality of virtual HSMs and wherein the virtual machine is authenticated to one of the virtual HSMs.

5. The integrated circuit device of claim 1, wherein the data processing pipeline parses data to determine header source and destination data and wherein the key usage interface receives the header source and destination data to determine a cryptographic context for the respective data.

6. The integrated circuit device of claim 5, wherein the HSM uses the cryptographic context of a respective packet to determine keys to use to encrypt and decrypt the respective packet.

7. The integrated circuit device of claim 1, wherein the HSM further comprises a protected memory partition of a memory, wherein the HSM writes the encryption keys into the protected memory partition and wherein the crypto engine reads keys from the protected memory partition to use to encrypt and decrypt the packets.

8. The integrated circuit device of claim 7, wherein the secure key storage is persistent and wherein the HSM further comprises a trust module, the trust module having a processor and a trust key, and wherein the trust module is configured to read the keys from the secure key storage, decrypt the keys using the trust key and write the decrypted keys into the protected memory partition and to read the keys from the protected memory partition, to encrypt the keys using the trust key and write the keys into the secure key storage.

9. The integrated circuit device of claim 8, wherein the trust key is a physical hardware key.

10. The integrated circuit device of claim 9, wherein the physical hardware key is a physically unclonable function tied to physical properties of a silicon die of the integrated circuit on which the HSM is formed.

11. The integrated circuit device of claim 1, wherein the HSM further comprises a key management interface coupled to the PCIe interface and to the secure key storage to conditionally allow key management of the keys of the secure key storage by a connected host through the PCIe interface.

12. The integrated circuit device of claim 11, wherein the key management interface authenticates the connected host based on presence on the PCIe interface as a virtual machine and based on a virtual function invoked by the virtual machine and exposes a set of keys to the host in response to the authentication.

13. The integrated circuit device of claim 1, further comprising an external port separated from the data processing pipeline and wherein the HSM comprises a key management interface coupled to the external port for communication with an external policy manager.

14. The integrated circuit device of claim 13, wherein the external port is coupled to the HSM through a processor within the integrated circuit I/O device and wherein the processor has a secure execution context used in communication with the external policy manager and the key management interface.

15. The integrated circuit device of claim 14, wherein the secure execution context is a secure monitor mode of an ARM processor.

16. The integrated circuit device of claim 13, wherein the key management interface authenticates the external policy manager using credentials and wherein the key management interface exposes a set of keys to the external policy manager in response to the authentication.

17. The integrated circuit device of claim 1 included in a network interface card for a PCIe slot of a server.

18. A method comprising:
processing data in a data processing pipeline coupled between an I/O port and a host interface within an integrated circuit device, wherein the host interface comprises a Peripheral Component Interface express (PCIe) interface;
receiving data from the data processing pipeline at a hardware security module (HSM) coupled to the data processing pipeline and within the integrated circuit device;
processing and forwarding data in the data processing pipeline between the I/O port and the PCIe interface; and
encrypting and decrypting the received data by a crypto engine within the HSM using locally stored keys that are decrypted and copied from a secure key storage of the HSM, wherein the secure key storage contains keys that are encrypted by the HSM and that are accessible through the HSM;
further comprising the HSM determining a cryptographic context for the respective received data based on a PCIe endpoint of the respective packets; and
wherein encrypting and decrypting the received data comprises selecting keys for use in encrypting and decrypting that are identified by the respective cryptographic context.

19. The method of claim 18, further comprising;
reading the encrypted keys from the secure key storage;
decrypting the keys by the crypto engine; and
writing the decrypted keys into a protected memory partition of a memory,
wherein encrypting and decrypting the received data comprises encrypting and decrypting the keys using keys in the protected memory partition.

20. An integrated circuit device comprising:
an I/O port;
a host interface configured to be connected to a host, wherein the host interface comprises a Peripheral Component Interface express (PCIe) interface;
a data processing pipeline within the integrated circuit device coupled to the I/O port and to the PCIe interface and configured to process and forward data between the I/O port and the PCIe interface; and
a hardware security module (HSM) within the integrated circuit device coupled to the PCIe interface and to the data processing pipeline, the HSM comprising a crypto engine configured to encrypt and decrypt data of the data processing pipeline, and a secure key storage coupled to the crypto engine and configured to contain encryption keys for use in encrypting and decrypting packets, wherein the secure key storage is configured to contain keys that are encrypted by the HSM and that are accessible through the HSM;

wherein the HSM is configured to determine a cryptographic context for data processed between the I/O port and the PCIe interface based on a PCIe endpoint of the data, and to select keys for use in encrypting and decrypting that are identified by the cryptographic context.

21. The integrated circuit device of claim 20, wherein the HSM further comprises a key management interface coupled to the PCIe interface and to the secure key storage and configured to conditionally allow key management of the keys of the secure key storage by a connected host through the PCIe interface.

22. The integrated circuit device of claim 21, wherein the key management interface is configured to authenticate the connected host based on presence on the PCIe interface as a virtual machine and based on a virtual function invoked by the virtual machine and to expose a set of keys to the host in response to the authentication.

23. The integrated circuit device of claim 20, wherein the HSM further comprises a key usage interface coupled to the data processing pipeline, wherein the key usage interface is configured to be accessed by key users of the host through the PCIe interface to encrypt and decrypt data in the data processing pipeline and wherein the key usage interface is configured to authenticate and identify the key users based on functions of the PCIe interface that are invoked by the key users to access the data processing pipeline;

wherein the key users are virtual machines and wherein the functions are virtual functions of the PCIe interface and wherein the virtual machines are authenticated based on presence on the PCIe interface and identified based on virtual functions invoked by the respective virtual machine; and wherein the HSM is configured to use a cryptographic context of a respective packet to determine keys to use to encrypt and decrypt the respective packet.

* * * * *